United States Patent [19]

Van Hook et al.

[11] Patent Number: 5,084,181
[45] Date of Patent: Jan. 28, 1992

[54] ENRICHMENT OF WATER IN COMPONENTS OF HEAVY WATER

[75] Inventors: W. Alexander Van Hook, Knoxville, Tenn.; Andrzej G. Chmielewski; Grazyna Zakrzewska-Trznadel, both of Warsaw, Poland; Nada Miljevic, Belgrade, Yugoslavia

[73] Assignee: The University of Tennessee Research Corporation, Knoxville, Tenn.

[21] Appl. No.: 535,172

[22] Filed: Jun. 8, 1990

[30] Foreign Application Priority Data

Jun. 9, 1989 [PL] Poland .................................. 279948

[51] Int. Cl.⁵ .............................................. B01D 61/00
[52] U.S. Cl. .................................. 210/640; 210/650; 210/651; 210/653; 210/500.27; 55/16; 55/17; 423/580
[58] Field of Search ........... 210/651, 650, 653, 500.21, 210/500.27, 640; 204/258; 252/631; 423/210, 580; 429/13; 55/17, 16

[56] References Cited

U.S. PATENT DOCUMENTS

| | | | |
|---|---|---|---|
| 3,789,112 | 6/1974 | Pachaly | 423/580 |
| 3,953,568 | 4/1976 | Seko et al. | 423/7 |
| 4,284,418 | 8/1981 | Andres | 55/17 |
| 4,285,701 | 8/1981 | Schlenker | 55/17 |
| 4,331,522 | 5/1982 | Pierini | 423/580 |
| 4,399,120 | 8/1983 | Cheung | 423/580 |
| 4,504,460 | 3/1985 | Mandrin | 423/580 |
| 4,770,785 | 9/1988 | Schaupert | 210/640 |
| 4,818,345 | 4/1989 | Jönsson | 210/640 |
| 4,879,041 | 11/1989 | Kurokawa et al. | 210/640 |

FOREIGN PATENT DOCUMENTS

| | | | |
|---|---|---|---|
| 335648A | 3/1989 | European Pat. Off. | 210/650 |
| 2406720 | 8/1974 | Fed. Rep. of Germany | 55/17 |

OTHER PUBLICATIONS

U.S. Application Ser. No. 07/534,960, filed Jun. 8, 1990, entitled "Method of Enrichment of Oxygen-18 in Natural Water".

Primary Examiner—Robert A. Dawson
Assistant Examiner—Ana Fortuna
Attorney, Agent, or Firm—Luedeka, Hodges, Neely & Graham

[57] ABSTRACT

A method for the enrichment of the natural water in the components of heavy water such as $D_2O$ and/or HDO being the source of deuterium. The method utilizes the passing of water through semipermeable hydrophobic membranes on which phase transition occurs. The latter is caused by vacuum or neutral carrier gas on the vapor side of the membrane. Lighter isotopes preferentially pass through the membrane leaving the original water enriched in heavy water components.

7 Claims, 7 Drawing Sheets

ENRICHMENT OF WATER IN COMPONENTS OF HEAVY WATER

The subject of this invention is a method of water enrichment in components of heavy water such as Dhd 2O and/or HDO.

The production of heavy water by the enrichment of natural water in heavy isotopes has been known for many years. Several methods have been used, among others distillation, electrolysis, isotope exchange between water and hydrogen sulfide and low-temperature distillation of liquid hydrogen.

The production of heavy water is very expensive mainly because of very low concentration of deuterium in all available raw materials. Installations for $D_2O$ production consist of numerous large separation columns and sometimes are larger than some chemical factories.

After discovery of deuterium, many enrichment methods have been considered but only few of them are realized in large scale. These are isotope exchange reactions (in the systems: $H_2O$ —$H_2$, $H_2O$ —$H_2S$, $NH_3$ —$H_2$), electrolysis and distillation of water and hydrogen.

Isotope exchange reaction between water vapors and hydrogen followed by electrochemical enrichment has been developed in Canada (Trail) and in Norway. In the 1950's the great demand for heavy water in USA led to the development of a new enrichment method of deuterium in water called Girgler - Sulphide (GS) method. This method has been considered as the most effective one. Two huge installations each giving 500 Mg/year were built —one in Dana (Indiana) and another in Savannah River (South Carolina). The installations in Savannah River are still working. The GS process was adopted in mid 60's in Canada. Total production of heavy water in Canada is 1600 Mg/year. There is one working GS installation in India having working capacity of 100 Mg/year, another three each of a capacity of 65 Mg/year are based on ammonia - hydrogen exchange reaction. The same method is used in France.

The distillation of water was carried out in USA during World War II. The low-temperature distillation of hydrogen has been carried out in installations built in India and Soviet Union.

The production of heavy water is very expensive and only rich countries can afford it.

The methods listed above have good and bad points as well. For example, the highly efficient (very large separation factor) electrolytical method needs a lot of energy and therefore it has not been used as an independent process on larger scale. Energy demand in this process is equal to 15,000 kWh per lkg of $D_2O$. Another disadvantage of this method is use of the large volume apparatus in the initial stages of the electrolytical cascade and appreciable loss of deuterium evolving together with hydrogen on the cathode.

The most frequently used isotope exchange reactions are expensive too, separation factors are not large and enrichment is usually not greater than 25% (starting from natural water). In the case of the GS method, corroding properties of hydrogen sulphide makes the process even more difficult and therefore suitable materials resistant for $H_2S$ corrosion should be used.

The distillation method is the simplest and the best known enrichment method. However, it is characterized by the low separation factor and huge amounts of raw material (water) necessary —to produce 1 t of $D_2O$, one should use 250,000 t of water. The low temperature distillation of hydrogen is a fairly attractive method because of its low vaporization heat and high separation factor. The main weaknesses of this method are extremely low temperature and the danger of working with liquid hydrogen.

It appears however that heavy water can be obtained in a simple and competitive way compared to the methods mentioned above.

In the course of the investigations of prevaporation process, i.e., a permeation process through the semipermeable membrane followed by phase transition, it was found that using some membranes one can get much larger fractionation factor for the mixture of light and heavy water than was obtained in distillation process.

The method of the water enrichment in heavy isotopes of hydrogen is carried out in the pervaporation process while the diffusing vapors through the semipermeable membrane are enriched in lighter isotope component. The method employs the selectivity of the semipermeable membranes known in many industrial applications. Thus, that water which does not pass through the membrane is enriched in heavy water components.

In the course of the investigations of pervaporation process in the mixture of light and heavy water using membranes of different affinity towards water, the isotope effect has been observed and in the case of hydrophobic membranes it was higher than that observed in vapor pressures.

According to their affinity to water (degree of wettability) polymer materials are divided into hydrophilic and hydrophobic. The hydrophilic materials are: regenerated cellulose, cellulose acetate, polyvinyl alcohol, polyacrylonitrile, nylon. The hydrophobic materials are: polypropylene, polytetrafluoroethylene, silicone rubber, cellulose esters.

The permeation process followed by phase transition (due to its complex character called pervaporation) has been used for years in the separation of liquid mixtures. In the course of such separation, the liquid is in contact with one side of the polymer membrane (usually 40 –60 $\mu$m thick) and after permeation through the membrane is taken out as a vapor in the stream of neutral gas or by generation of a vacuum on the vacuum side of membrane, resulting in enrichment in one of the components.

The composition of the vapor depends on the temperature and initial composition of the liquid and the material of the membrane and on many other factors as well the driving force of the pervaporation process is the gradient of the chemical potential caused by the difference of pressure on both sides of the membrane and by the change of the physical state of the substances being separated. The process is fast and this makes it possible to use it on the technological scale especially in these cases where the use of the more conventional methods is nonadvantageous or need extremely complex apparatus, for example:

separation of azeotropic mixtures; separation of closely boiling mixtures
  separation of aromatic and aliphatic hydrocarbons
  separation of isomers
  dehydrogenation of alcohols, organic acids, amines and ketones
  removing of the reaction products from the chemical reactors (i.e., water for the estrification reactions), separation of mixtures consisting of terminally unstable components.

The application of the permeation method in the technological scale has been possible due to the development in polymer physics —it is possible now to obtain membranes of high selectivity and permeability. In the permeation processes of separation of liquid mixtures lyophilic membranes have been usually used. This means that the membrane is wetted at least by one of the components. Recently lyophobic membranes have been successfully used in the desalination of water, in the processes of the concentration of acids, etc.

Taking into account the value of the separation factor and other advantages, i.e., the possibility of carrying out the process at any of several temperatures and hence at ambient temperature in particular, the present method becomes very competitive in comparison to other methods of water enrichment, for example distillation.

The pervaporation process can be carried out in relatively simple apparatus. It is shown in FIGS. 1, 2 and 3. Separation factors for Tarflen-5 and Tarflen-6 are shown in FIGS. 4 and 5. A comparison of separation factors with hydrophilic and hydrophobic membrane separation factors is shown in FIG. 6. Water permeability vs. temperature plots at 4 torr downstream are shown for 3 membranes in FIG. 7.

Figure 1:
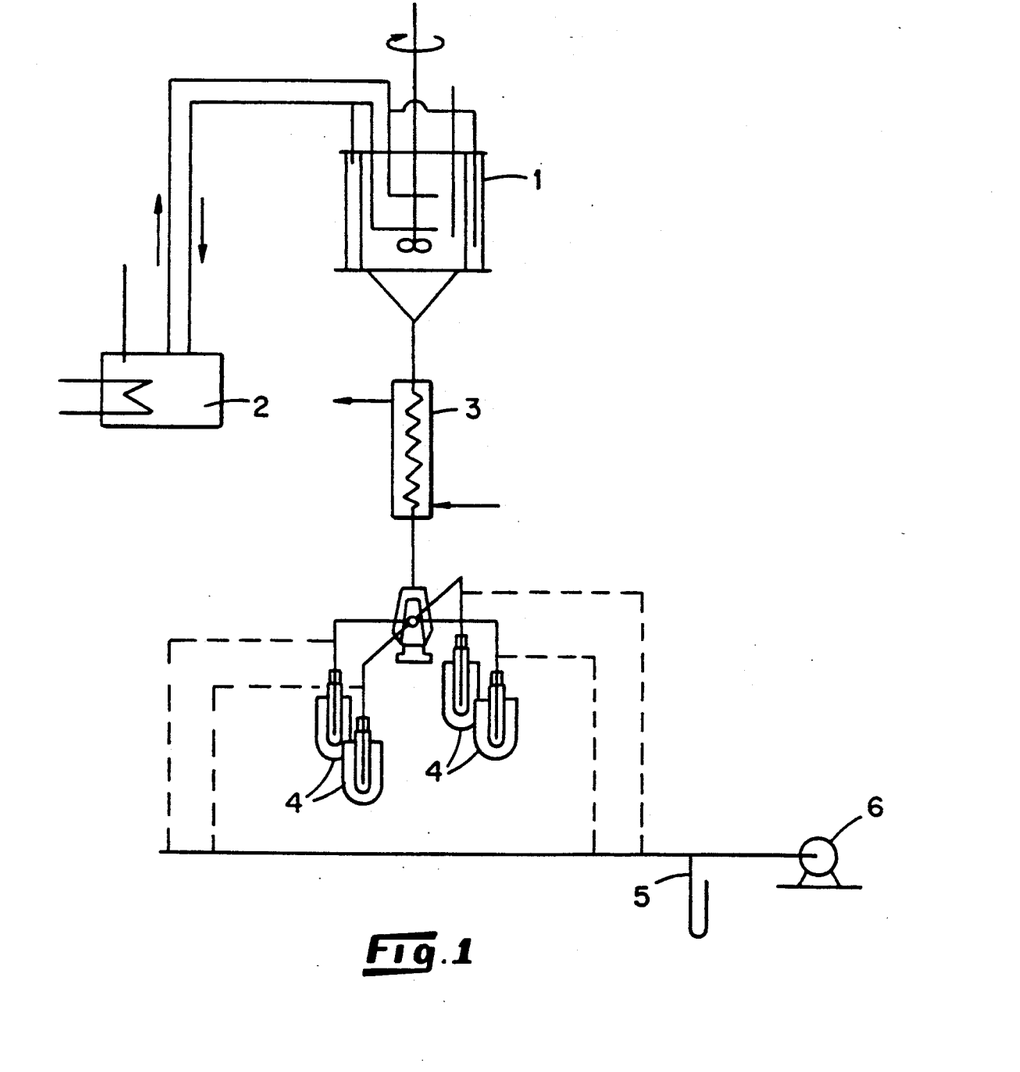

The schematic of the system for isotopic enrichment in pervaporation process is shown in FIG. 1. The liquid is placed in the permeation chamber 1 equipped with the thermostat 2, cooler 3, receiver 4, manometer 5 and vacuum pump 6.

Figure 2:
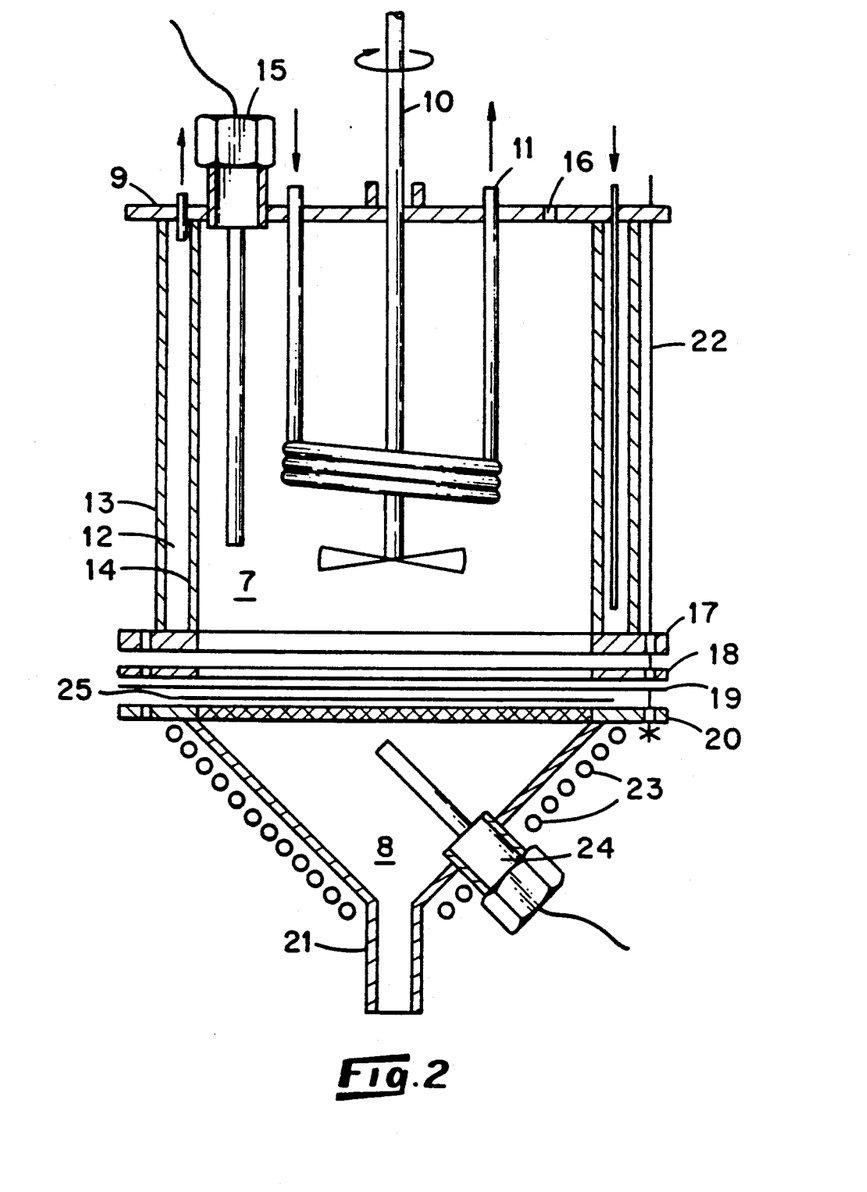

The schematic of the permeation chamber consisting of two parts is shown on the FIG. 2. The liquid chamber 7 is built from the two concentric glass cylinders 13 and 14 which form thermostatting jacket 12. They are tightened by steel collars 9 and 17 and threaded rods 22. The temperature of the fluid in chamber 7 is monitored and controlled by the heating (cooling) coil 11 and the resistance thermometer 15. The uniform temperature and concentration field is secured by the stirrer 10. The membrane 19 is placed on the perforated bottom 20 supported by plastic net 25 and rubber gasket 18. The temperature in the vapor chamber is controlled by the resistance thermometer 24. The pipe 21 is the outlet to vacuum pump.

Figure 3:
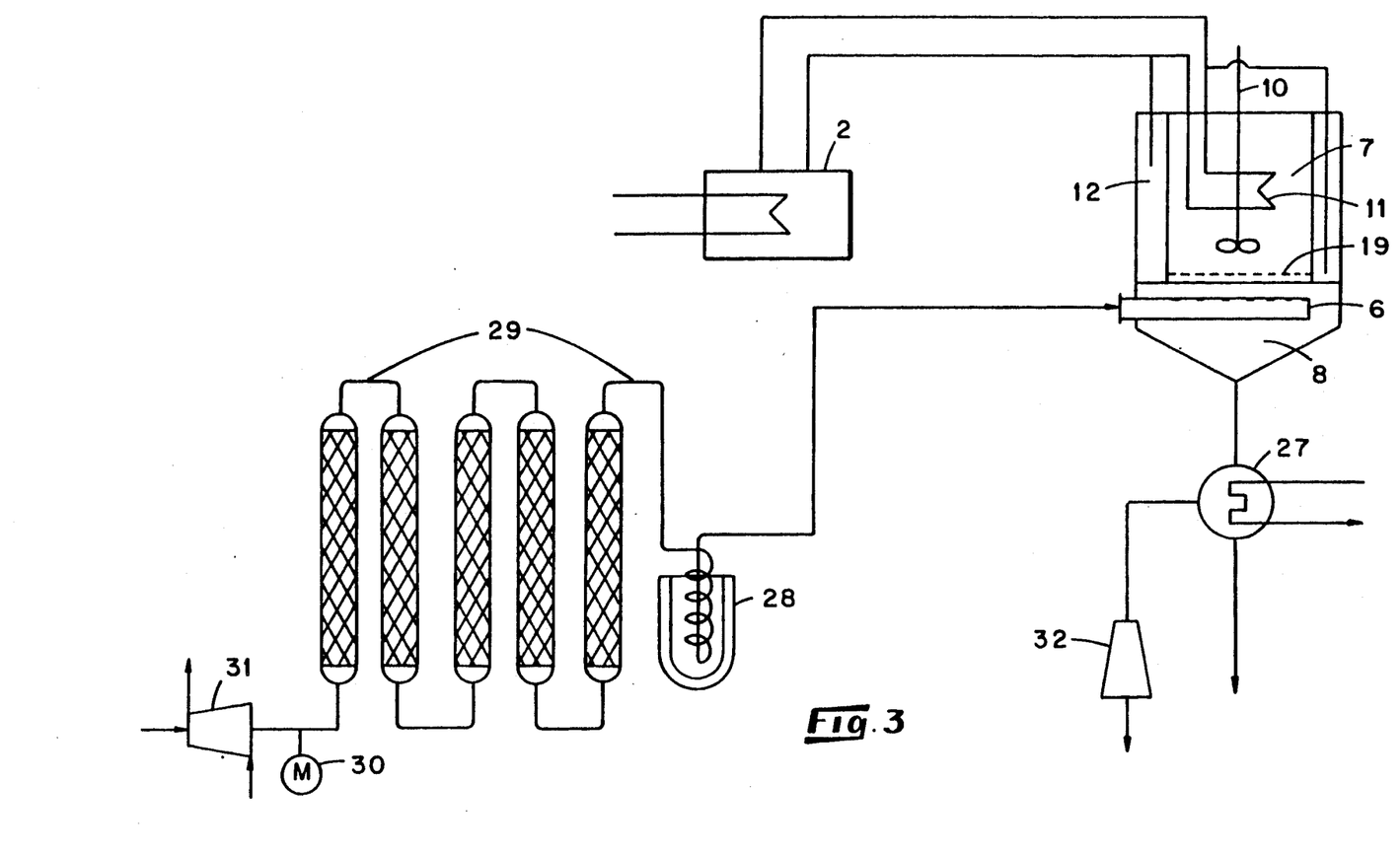

In the apparatus shown in FIG. 3, the pervaporation process with carrier gas can be carried out. The pervaporation chamber is divided by the membrane 19 into two sections: liquid 7 and vapor 8 compartments. The constant temperature in the jacket 12 is kept by thermostat 2. Temperature is regulated by heating coil 11. The stirrer 10 assures the uniformity of temperature and concentration. The carrier gas compressed by the compressor 31 and then dried in the drying column system 29 and cold trap 28 goes through the separator 6 ensuring uniform sweeping of the gas over the membrane surface. The gas flow is controlled by the manometer 30. The vapor permeate condenses in the condenser 27 and gas is allowed to escape through the rotometer 32.

EXAMPLE I

The process of the pervaporation was carried out in the systems shown in FIGS. 1 and 2.

1000 cc of water (initial D concentration was 190 ppm) was placed in the chamber 7 which is separated from the vapor chamber 8 by a hydrophobic semipermeable membrane. After the temperature of water in chamber 7 had been established, the pressure in chamber 8 was lowered below the boiling point of water. Whereas water diffuses through the membrane, the phase transition is occurring and water is taken out as a vapor in the vapor chamber. Next the vapor is condensed in the cold trap and analyzed. The separation factor for the process being carried out under these conditions is equal to 1.079 at 30° C. and at pressure in the vapor chamber equal to 4 Torr.

The results obtained are presented in Table I below:

TABLE I

| P(Tr) | t(°C.) | ln(α men) |
|---|---|---|
| 6 | 20 | 1.077 |
| 6 | 30 | 1.078 |
| 6 | 40 | 1.0798 |
| 6 | 50 | 1.0700 |
| 6 | 60 | 1.0637 |
| 6 | 70 | 1.0525 | p = pressure in the vapor chamber in Torr,
t = the temperature in °C., and
ln(α men) = the separation factor.

EXAMPLE II

Another pervaporation process is carried out in the system shown in FIG. 3. The vapors of the diffusing liquid are taken away by the stream of a neutral gas (favorably air) which sweeps the bottom side of the membrane. The carrier gas delivered to the separator is dried in the system of drying columns and by freezing in the liquid nitrogen. The vapors of the permeate carried by the carrier gas are cooled in the condenser and at last are frozen out in the cooling agent.

HOH/HOD separation factors on water permeation through hydrophilic membranes are significantly less than the equilibrium vapor pressure ratio, itself equivalent to the liquid/vapor separation factor observed for distillation. Separation factors for $^{18}O/^{16}O$ on permeation through hydrophobic polytetrafluoroethylene (PTFE) membranes and are as large as six times those for single stage distillation. In accordance with the present invention, H/D separation factors for permeation through the hydrophobic PTFE membranes have unexpectedly been found to be enhanced. Separation factor is defined as:

$$\ln(\alpha_{mem}) = \ln\left((x'/x)\text{downstream}/(x'/x)\text{upstream}\right)$$

The prime denotes the lighter isotope and x the mole fraction. These H/D separations are also enhanced relative to distillation.

$$\ln(\alpha_{mem}(\text{hydrophobic})) > \ln(\alpha_{l/v}) = \ln(P^{o'}/P^{o})$$
$$= \ln((x'/x)/(x'/x)_l)$$

In the present experiments three different polytetrafluoroethylene (PTFE) membranes were used. All were formulated at The Technical University, Szczecin, by Chlubek from polymer produced by Z. A. Tarnow, Inc. (MS =140 ti 500×10² daltons, 80–85% crystallinity, density 2.25 to 2.27 g cm$^{-2}$, and bulk density 0.4 to 0.6 g cm$^{-2}$). The membranes were made by subjecting PTFE tape (50 mm wide ×0.15 mm thick) to two dimensional tension, extracting with petroleum ether, and conditioning at 360 C. Pore diameters range from 1 to 100 micron and the wetting angle for water at room temperature is 106±2′. Further characterization is reported in Table II. Fractionation experiments were carried out in the Warsaw laboratory. Water permeabilities for Tarflen-5 varied smoothly from 1 g m$^{-2}$s$^{-1}$ at 30° C. to 13 g m$^{-1}$s$^{-}$at 80° C. at a downstream pressure of 4 torr in FIG. 6 (the upstream pressure is a nominal 1 atm.), and from 1 to 14 g m$^{-1}$ s$^{-1}$ at 30 and 90 C., respectively at 160 torr downstream. The Tarflen-6 is less permeable than Tarflen-5 (see Table II) and the equivalent figures are 0.5 and 9 g m's$^{-1}$ at 4 torr downstream, and 0.2 and 11 g m$^{-2}$ s$^{-1}$ at 160 torr downstream. Water permeability vs. temperature plots at 4 torr downstream are shown for the three membranes in FIG. 7. Membrane 1 ruptured early in the experiments and fractation data from it is only available at 4 torr. For the H/D experiments the feed was enriched to about 200 ppm D. H/D analyses of feed and membrane fractionated samples were obtained using the SIRA 12 VG Isogas mass spectrometer at the Boris Kidric Institute. Prior to introduction to the mass spectrometer the samples were reduced to elemental hydrogen with metallic zinc at 460 C. The analyses were obtained relative to V-SMOW standard with a reproducibility of ±0.05 ppm D.

Figure 4:
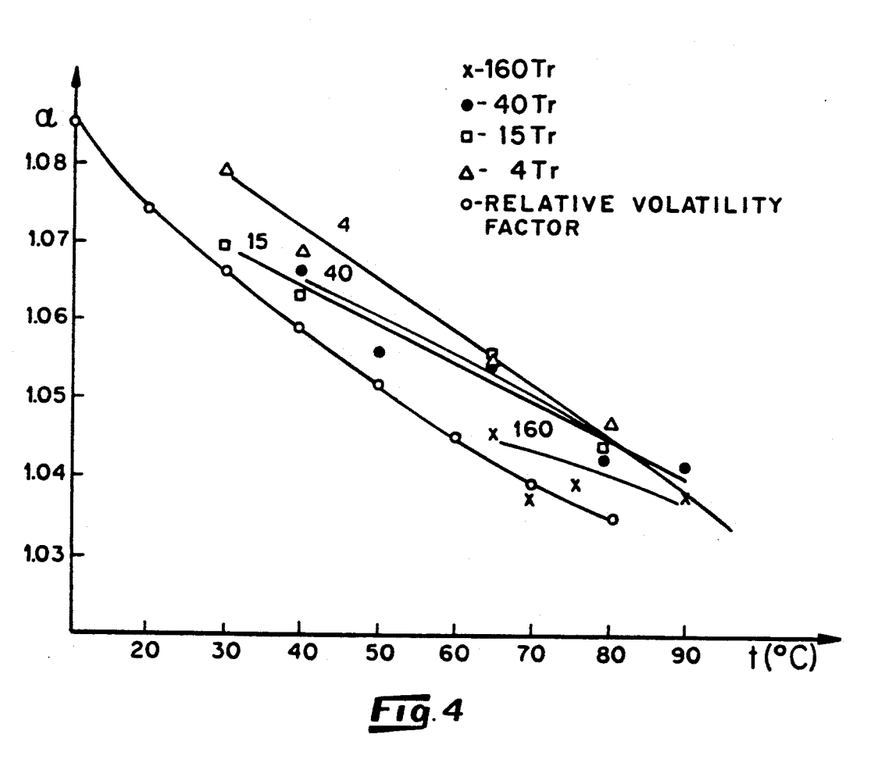
Figure 5:
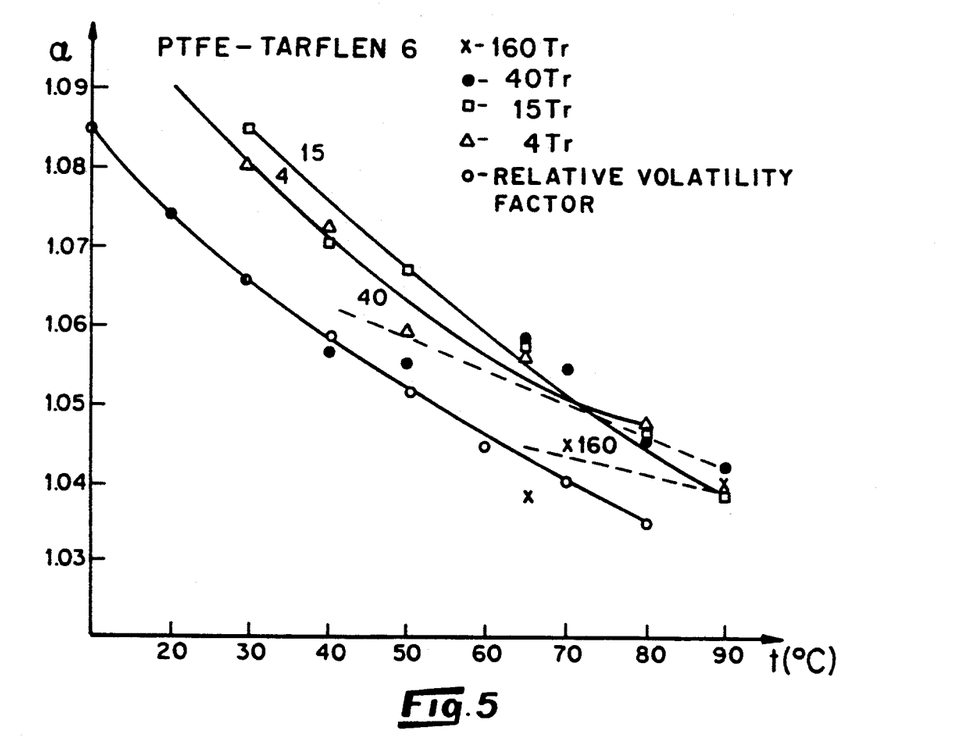

Permeability measurements were carried out between 20 and 90° C. at downstream pressures of 4, 15, 40 and 160 torr for membranes 5 and 6 and at 4 torr for membrane 1. Separation factors for Tarflen-5 and Tarflen-6 are shown in FIGS. 4 and 5. The 4 torr data for Tarflen-1 parallels that for the other two, but is displaced toward higher $\alpha$ by about 0.004 to 0.006 natural logarithm units. Equilibrium liquid vapor separation factors, $\alpha_{1/v}$ (denoted in the figures as "the relative volatility factor") are also shown. Both $\alpha_{1/v}$ and $\alpha$membrane decrease smoothly with temperature. The membrane separation factors lie consistently above $\alpha_{1/v}$ by 0.013±0.003 natural logarithm units across the entire range of temperature and the ratio, $R = \alpha_{membrane}/\alpha_{1/v}$ varies between 1.2 to 1.3. The enhancement in the separation factor, while uniformly positive and significant, is smaller than for $^{18}$O/$^{16}$O separations on the very same membranes where R is as large as 6. The observed marked difference in $R_{H/D}$ and $R_{16/18}$ is believed to be attributable to different transport mechanisms through the membrane for hydrogen and oxygen. In turn, these can be understood by the relative ease of H/D as compared to oxygen exchange along a hydrogen bonded network of waters adsorbed on the pore surface.

Figure 6:
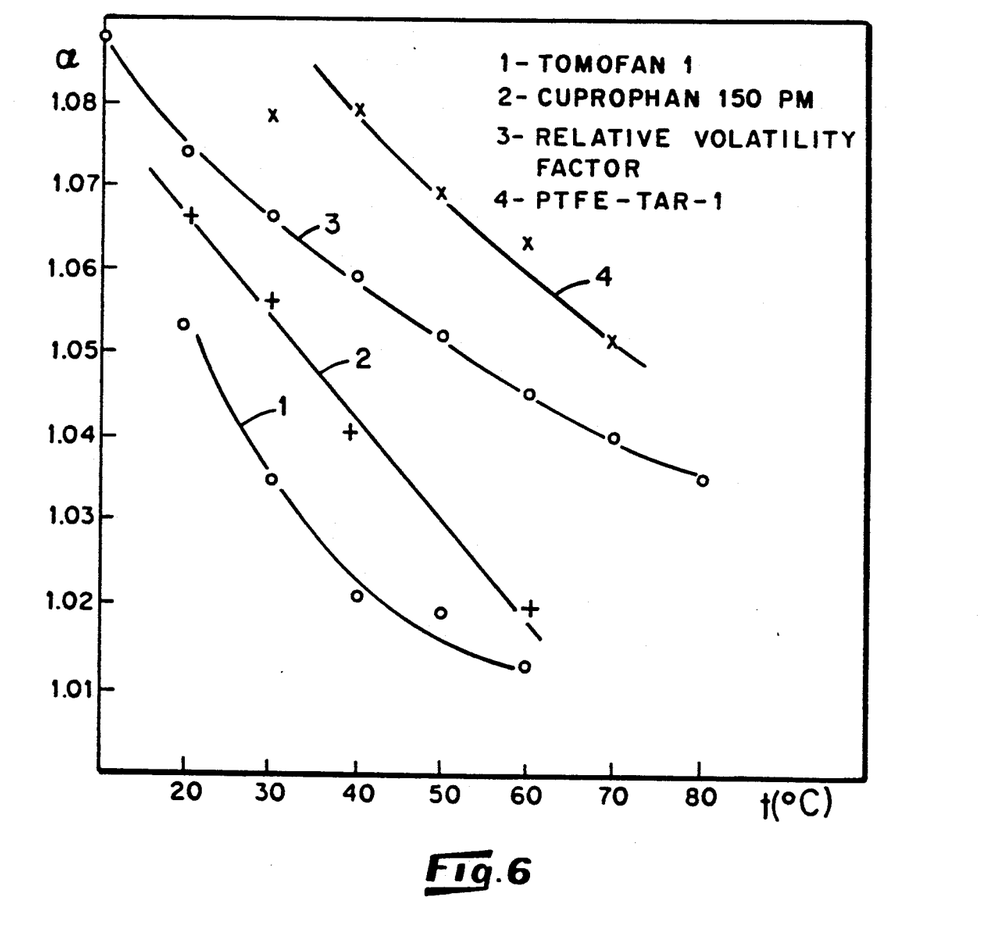
Figure 7:
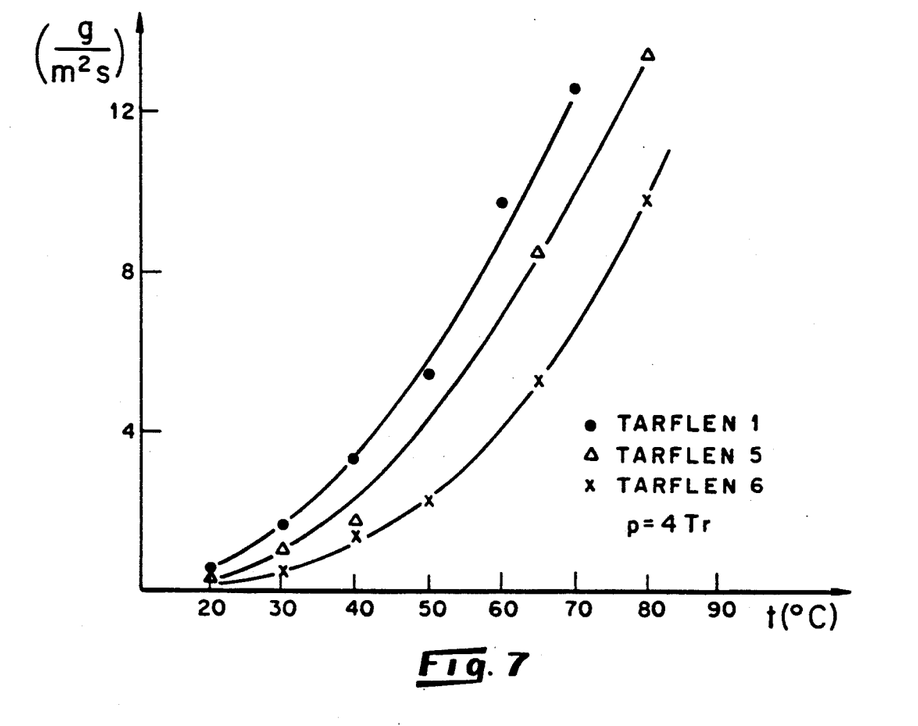

A comparison of the H/D separation factors on distillation, $\alpha_{1/v}$, with hydrophilic and hydrophobic membrane separation factors, $\alpha_{membrane}$ is given in FIG. 6 for separation factors on the cellulosic membranes and Tarflen-1, all at 4 torr downstream pressure, shown together with $\alpha_{1/v}$. The data for Tarflen-5 and Tarflen-6 are not plotted in order to avoid clutter, but they lie close to Tarflen-1. The figure nicely demonstrates opposite effects of roughly the same size on $\alpha_{1/v}$ for PTFE/water and cellulosic membrane/water interactions.

TABLE II

Room Temperature Properties of Polytetrafluoroethylene Membranes

| Membrane | Thickness/microns | P/kPA | Air Permeability (m$^2$ air)/((m$^2$ mem) (day)) |
|---|---|---|---|
| Tarflen-1 | 6.20 | 2.67 | 1012 |
| | | 4.00 | 1323 |
| | | 5.33 | 1638 |
| Tarflen-5 | 84.6 | 2.73 | 378 |
| | | 4.00 | 614 |
| | | 5.33 | 930 |
| Tarflen-6 | 72.7 | 2.73 | 96 |
| | | 4.00 | 172 |
| | | 5.33 | 237 |

What is claimed is:

1. A method comprising enriching natural water in the components of heavy water further by enabling enrichment of water in D$_2$O and/or HDO employing semipermeable membranes having properties for retaining the enriched water on the natural water side of the membrane.

2. The method according to claim 1 wherein a pervaporation process including a phase transition from liquid to vapor is carried out on the semipermeable membranes.

3. The method according to claim 2 wherein a vacuum is employed on the vapor side of the membranes.

4. The method according to claim 2 wherein a neutral carrier gas is employed on the vapor side of the membrane.

5. The method according to claim 1 wherein hydrophobic membranes are used.

6. The method according to claim 5 wherein polytetrafluoroethylene membranes are used.

7. The method according to claim 1 wherein demineralized, perferably multiple distilled water is used in the enrichment process.

* * * * *

UNITED STATES PATENT AND TRADEMARK OFFICE
CERTIFICATE OF CORRECTION

PATENT NO. : 5,084,181

DATED : January 28, 1992

INVENTOR(S) : W. Alexander van Hook, Andrzej G. Chmielewski, Grazyna Zakrzewska-Trznadel and Nada Miljevic It is certified that error appears in the above-identified patent and that said Letters Patent is hereby corrected as shown below:

Column 1, lines 6-7

Delete "Dhd 20" and insert --$D_2O$-- therefor.

Column 5, line 6

Delete "9 g m's$^{-1}$" and insert --9 g m$^{-2}$ s$^{-1}$-- therefor.

Column 5, line 11

Delete "fractation" and insert --fractionation-- therefor

Column 5, line 37

Delete "$^{18}$O/hu 16O" and insert --$^{18}$O/$^{16}$O-- therefor.

Signed and Sealed this

Twenty-seventh Day of April, 1993

Attest:

Attesting Officer

MICHAEL K. KIRK

Acting Commissioner of Patents and Trademarks